(12) United States Patent
Freiheit

(10) Patent No.: US 12,346,129 B2
(45) Date of Patent: Jul. 1, 2025

(54) SYSTEMS AND METHODS FOR WIND COMPENSATION OF AN ELECTRIC AIRCRAFT

(71) Applicant: BETA AIR, LLC, South Burlington, VT (US)

(72) Inventor: Collin Freiheit, Burlington, VT (US)

(73) Assignee: BETA AIR, LLC, South Burlington, VT (US)

(*) Notice: Subject to any disclaimer, the term of this patent is extended or adjusted under 35 U.S.C. 154(b) by 0 days.

(21) Appl. No.: 18/074,350

(22) Filed: Dec. 2, 2022

(65) Prior Publication Data
US 2023/0137649 A1   May 4, 2023

Related U.S. Application Data

(63) Continuation of application No. 17/515,420, filed on Oct. 30, 2021, now Pat. No. 11,561,558.

(51) Int. Cl.
*G05D 1/00* (2024.01)
*B64D 43/00* (2006.01)

(52) U.S. Cl.
CPC .......... *G05D 1/0825* (2013.01); *B64D 43/00* (2013.01); *G05D 1/0858* (2013.01); *G05D 1/102* (2013.01)

(58) Field of Classification Search
None
See application file for complete search history.

(56) References Cited

U.S. PATENT DOCUMENTS

| | | | |
|---|---|---|---|
| 6,076,024 A | 6/2000 | Thornberg et al. | |
| 8,275,496 B2 | 9/2012 | Rupnik et al. | |
| 8,960,592 B1 | 2/2015 | Windisch | |
| 9,096,314 B2 | 8/2015 | Brotherton-Ratcliffe et al. | |
| 9,315,255 B2 | 4/2016 | Weber et al. | |
| 9,979,463 B1 | 5/2018 | Shafer et al. | |
| 10,488,870 B2 | 11/2019 | Greenfield et al. | |
| 10,625,858 B2 | 4/2020 | Eleryan et al. | |
| 10,809,744 B2 | 10/2020 | White | |
| 2005/0035242 A1 | 2/2005 | Nugent et al. | |
| 2011/0295569 A1* | 12/2011 | Hamke | G01P 7/00 703/2 |

OTHER PUBLICATIONS

Boyang Li, et al. "Model Predictive Control for Path Tracking of a VTOL Tail-sitter UAV in an HIL Simulation Environment", Jan. 2018, 2018 AIAA Modeling and Simulation Technologies Conference, pp. 3-14 (Year: 2018).*

Jose Alfredo Guerrero, Yasmina Bestaoui, UAV path planning for structure inspection in windy environments, Jan. 31, 2013.

Boyang Li, et al. "Model Predictive Control for Path Tracking of a VTOL Tall-Sitter UAV in an HIL Simulation Environment", Jan. 2018, 2018 AIAA Modeling and Simulation Technologies Conference, pp. 3-14 (Year: 2018).

Kristofer Kevin Nemirsky, "Simulated Annealing-Based Optimal Proportional- Integral Derivative (PID) 3 Controller Design: A case Study on Nonlinear Quadcopter Dynamics", 2017, San Jose State University (Year: 2017).

* cited by examiner

*Primary Examiner* — Hongye Liang
(74) *Attorney, Agent, or Firm* — Lee & Hayes, P.C.

(57) ABSTRACT

Provided in this disclosure is a system and methods for wind compensation of an electric aircraft. More specifically, provided in this disclosure is a controller of an aircraft configured to use a plant model for compensating for wind forces. The processor is configured to receive, from the sensor, at least a geographical datum of the electric aircraft.

20 Claims, 7 Drawing Sheets

SYSTEMS AND METHODS FOR WIND COMPENSATION OF AN ELECTRIC AIRCRAFT

CROSS-REFERENCE TO RELATED APPLICATIONS

This application is a continuation of Non-provisional application Ser. No. 17/515,420 filed on Oct. 30, 2021, and entitled "SYSTEMS AND METHODS FOR WIND COMPENSATION OF AN ELECTRIC AIRCRAFT," the entirety of which is incorporated herein by reference.

FIELD OF THE INVENTION

The present invention generally relates to the field of aviation. In particular, the present invention is directed to systems and methods for wind compensation of an aircraft.

BACKGROUND

Modern aircraft may establish a flight plan according to a variety of factors such as a desired destination, a necessary altitude, anticipated weather conditions, and provided fuel range. However, often a pilot must rely on situational awareness to compensate for actual environmental factors, such as wind, that would otherwise cause an aircraft to deviate from its intended, optimal flight path.

SUMMARY OF THE DISCLOSURE

In an aspect, a system for wind compensation of an electric aircraft may include a sensor attached to an electric aircraft, where the sensor is configured to detect at least a geographical datum; and a processor communicatively connected to the sensor. Further, the processor may be configured to receive the geographical datum from the sensor; generate, using a plant model, an optimal flight trajectory of the electric aircraft as a function of the geographical datum. Moreover, generating the optimal flight trajectory may include generating the plant model, where the plant model comprises at least an objective function; solving the at least an objective function sequentially, and generating the optimal flight trajectory as a function of the plant model.

In another aspect, a method for wind compensation of an electric aircraft may include receiving a geographical datum from a sensor communicatively connected to a processor and generating, by the processor, an optimal flight trajectory of the electric aircraft as a function of the geographical datum. Further, the method may include generating a plant model, wherein the plant model comprises at least an objective function, solving the at least an objective function sequentially, and generating the optimal flight trajectory as a function of the plant model.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
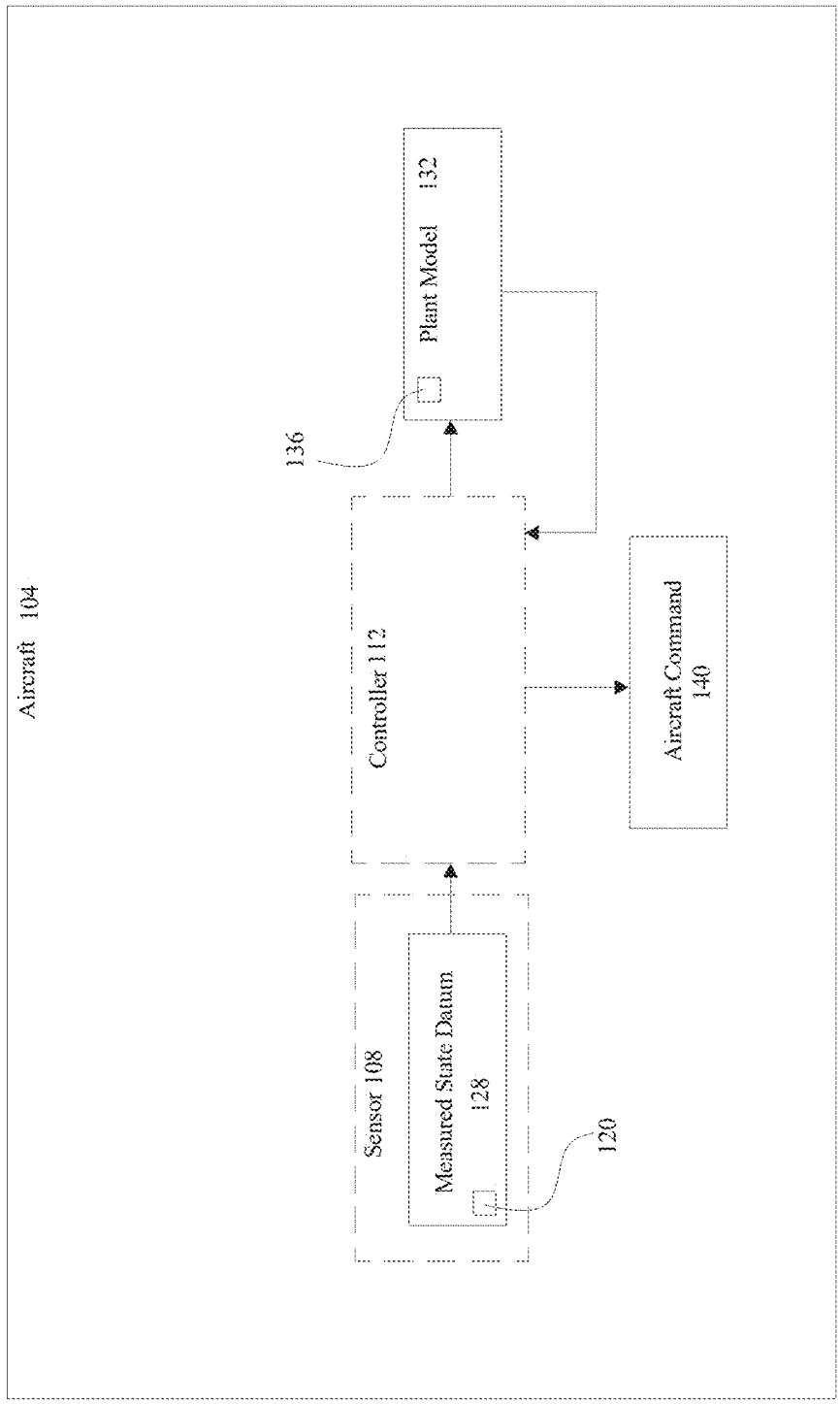
FIG. 1 is a block diagram of an exemplary embodiment of a system for wind compensation of an aircraft in accordance with one or more aspects of the present disclosure.

At a high level, aspects of the present disclosure are directed to a system and methods for wind compensation of an electric aircraft. More specifically, provided in this disclosure is a flight controller of an aircraft configured to prevent flight path alteration caused by environmental influences, such as wind, by using a plant model for compensating for wind forces. In some embodiments, an electric aircraft may include a vertical landing and takeoff (eVTOL) aircraft. In other embodiments, an electric aircraft may include an unmanned aerial vehicle. In other embodiments, an electric aircraft may include a drone. A system may include a sensor communicatively connected to a fight controller. In some embodiments, a sensor may include an accelerometer or inertial measurement unit (IMU).

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to orientations as illustrated for exemplary purposes in FIG. 4. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Now referring to FIG. 1, a system 100 for wind compensation of an electric aircraft 104 is shown. In one or more embodiments, system 100 includes a sensor 108, which may be attached to an electric aircraft 104 and configured to detect a geographical datum, such as a real-time location of aircraft 104 (x, y). For the purposes of this disclosure, a "geographical datum" is an electronic signal representing an element of data and/or a detected parameter correlated to a position and/or orientation of an electric aircraft relative to the surface of the earth. Aircraft 104 may include one or more components that generate lift, including without limitation wings, airfoils, rotors, propellers, jet engines, or the like, or any other component or feature that an aircraft may use for mobility during flight. Aircraft 104 may include, without limitation, an airplane, a rotor craft such as a helicopter, a drone, an aerostat, and/or any other aircraft, as consistent with descriptions in this disclosure.

Still referring to FIG. 1, sensor 108 may include a motion sensor. A "motion sensor", for the purposes of this disclosure, refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Sensor 108 may include, torque sensor, gyroscope, accelerometer, magnetometer, inertial measurement unit (IMU), pressure sensor, force sensor, proximity sensor, displacement sensor, vibration sensor, or the like. For example, without limitation, sensor 108 may include a gyroscope that is configured to detect a current aircraft orientation, such as roll angle.

In one or more embodiments, sensor 108 may include a plurality of weather sensors. In one or more embodiments, sensor 108 may include a wind sensor. In some embodiments, a wind sensor may be configured to measure a wind datum. A "wind datum" may include data of wind forces acting on an aircraft. Wind datum may include wind strength, direction, shifts, duration, or the like. For example, and without limitations, sensor 108 may include an anemometer. An anemometer may be configured to detect a wind speed. In one or more embodiments, the anemometer may include a hot wire, laser doppler, ultrasonic, and/or pressure anemometer. In some embodiments, sensor 108 may include a pressure sensor. "Pressure", for the purposes of this disclosure and as would be appreciated by someone of ordinary skill in the art, is a measure of force required to stop a fluid from expanding and is usually stated in terms of force per unit area. The pressure sensor that may be included in sensor 200 may be configured to measure an atmospheric pressure and/or a change of atmospheric pressure. In some embodiments, the pressure sensor may include an absolute pressure sensor, a gauge pressure sensor, a vacuum pressure sensor, a differential pressure sensor, a sealed pressure sensor, and/or other unknown pressure sensors or alone or in a combination thereof. In one or more embodiments, a pressor sensor may include a barometer. In some embodiments, a pressure sensor may be used to indirectly measure fluid flow, speed, water level, and altitude. In some embodiments, the pressure sensor may be configured to transform a pressure into an analogue electrical signal. In some embodiments, the pressure sensor may be configured to transform a pressure into a digital signal.

In one or more embodiments, sensor 108 may include an altimeter that may be configured to detect an altitude of aircraft 104. In one or more embodiments, sensor 108 may include a moisture sensor. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. In one or more embodiments, sensor 108 may include an altimeter. The altimeter may be configured to measure an altitude. In some embodiments, the altimeter may include a pressure altimeter. In other embodiments, the altimeter may include a sonic, radar, and/or Global Positioning System (GPS) altimeter. In some embodiments, sensor 108 may include a meteorological radar that monitors weather conditions. In some embodiments, sensor 108 may include a ceilometer. The ceilometer may be configured to detect and measure a cloud ceiling and cloud base of an atmosphere. In some embodiments, the ceilometer may include an optical drum and/or laser ceilometer. In some embodiments, sensor 108 may include a rain gauge. The rain gauge may be configured to measure precipitation. Precipitation may include rain, snow, hail, sleet, or other precipitation forms. In some embodiments, the rain gauge may include an optical, acoustic, or other rain gauge. In some embodiments, sensor 108 may include a pyranometer. The pyranometer may be configured to measure solar radiation. In some embodiments, the pyranometer may include a thermopile and/or photovoltaic pyranometer. The pyranometer may be configured to measure solar irradiance on a planar surface. In some embodiments, sensor 108 may include a lightning detector. The lightning detector may be configured to detect and measure lightning produced by thunderstorms. In some embodiments, sensor 108 may include a present weather sensor (PWS). The PWS may be configured to detect the presence of hydrometeors and determine their type and intensity. Hydrometeors may include a weather phenomenon and/or entity involving water and/or water vapor, such as, but not limited to, rain, snow, drizzle, hail and sleet. In some embodiments, sensor 108 may include an inertia measurement unit (IMU). The IMU may be configured to detect a change in specific force of a body.

In one or more embodiments, sensor 108 may include a local sensor. A local sensor may be any sensor mounted to aircraft 104 that senses objects or phenomena in the environment around aircraft 104. Local sensor may include, without limitation, a device that performs radio detection and ranging (RADAR), a device that performs lidar, a device that performs sound navigation ranging (SONAR), an optical device such as a camera, electro-optical (EO) sensors that produce images that mimic human sight, or the like. In one or more embodiments, sensor 108 may include a navigation sensor. For example, and without limitation, a navigation system of aircraft 104 may be provided that is configured to determine a geographical position of aircraft 104 during flight. The navigation may include a Global Positioning System (GPS), an Attitude Heading and Reference System (AHRS), an Inertial Reference System (IRS), radar system, and the like.

In one or more embodiments, sensor 108 may include electrical sensors. Electrical sensors may be configured to measure voltage across a component, electrical current through a component, and resistance of a component. In one or more embodiments, sensor 108 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor 108, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

In one or more embodiments, sensor 108 may include a sensor suite which may include a plurality of sensors that may detect similar or unique phenomena. For example, in a non-limiting embodiment, sensor suite may include a plurality of accelerometers, a mixture of accelerometers and gyroscope. System 100 may include a plurality of sensors in the form of individual sensors or a sensor suite working in tandem or individually. A sensor suite may include a plurality of independent sensors, as described in this disclosure, where any number of the described sensors may be used to detect any number of physical or electrical quantities associated with an aircraft. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained. Sensor 108 may be configured to detect pilot input from pilot control and/or controller 112. In one or more embodiments, a pilot control may include buttons, switches, or other binary inputs in addition to, or alternatively than digital controls about which a plurality of inputs may be received. Pilot control may be configured to receive pilot input. Pilot input may include a physical manipulation of a control like a pilot using a hand and arm to push or pull a lever, or a pilot using a finger to manipulate a switch. Pilot input may include a voice command by a pilot to a microphone and computing system consistent with the entirety of this disclosure. One of ordinary skill in the art, after reviewing the entirety of this disclosure, would appreciate that this is a non-exhaustive list of components and interactions thereof that may include, represent, or constitute, at least aircraft command. A pilot control may include a throttle lever, inceptor stick, collective pitch control, steering wheel, brake pedals, pedal controls, toggles, joystick. One of ordinary skill in the art, upon reading the entirety of this disclosure would appreciate the variety of pilot input controls that may be present in an electric aircraft consistent with the present disclosure. Inceptor stick may be consistent with disclosure of inceptor stick in U.S. patent application Ser. No. 17/001,845 and titled "A HOVER AND THRUST CONTROL ASSEMBLY FOR DUAL-MODE AIRCRAFT", which is incorporated herein by reference in its entirety. Collective pitch control may be consistent with disclosure of collective pitch control in U.S. patent application Ser. No. 16/929,206 and titled "HOVER AND THRUST CONTROL ASSEMBLY FOR DUAL-MODE AIRCRAFT", which is incorporated herein by reference in its entirety. The manipulation of a pilot control may constitute an aircraft command. A pilot control may be physically located in the cockpit of an aircraft or remotely located outside of the aircraft in another location communicatively connected to at least a portion of the aircraft. "Communicatively connected", for the purposes of this disclosure, is a process whereby one device, component, or circuit is able to receive data from and/or transmit data to another device, component, or circuit; communicative connecting may be performed by wired or wireless electronic communication, either directly or by way of one or more intervening devices or components. In an embodiment, communicatively connecting includes electrically coupling an output of one device, component, or circuit to an input of another device, component, or circuit. Communicatively connecting may be performed via a bus or other facility for intercommunication between elements of a computing device. Communicatively connecting may include indirect connections via "wireless" connection, low power wide area network, radio communication, optical communication, magnetic, capacitive, or optical coupling, or the like.

With continued reference to FIG. 1, system 100 includes sensor 108 communicatively connected to aircraft 104. Sensor 108 is configured to detect a measured state datum 128, such as geographical datum 120. A "measured state datum", for the purposes of this disclosure, is one or more elements of data representing actual motion, forces, moments, and/or torques acting on the aircraft and/or describing an environmental phenomenon in the real world. For example, and without limitation, measure state datum may include a current velocity of aircraft 104. Geographical datum may be one or more elements of data representing the physical position and/or orientation of an aircraft. For example, and without limitation, geographical datum may include a pitch angle of aircraft 104.

With continued reference to FIG. 1, a measured state datum 128 includes an inertial measurement unit. An "inertial measurement unit", for the purposes of this disclosure, is an electronic device that measures and reports a body's specific force, angular rate, and orientation of the body, using a combination of accelerometers, gyroscopes, and magnetometers, in various arrangements and combinations.

With continued reference to FIG. 1, controller 112 may receive geographical datum 120 from sensor 108. Embodiments may include a plurality of sensors in the form of individual sensors or a sensor working individually. Sensor 108 may include a plurality of independent sensors, where any number of the described sensors may be used to detect any number of physical or electrical phenomenon associated with aircraft 104. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of sensor 108 to detect phenomenon may be maintained.

Still referring to FIG. 1, sensor 108 may be communicatively connected to a processor, pilot control, and/or a controller, such as a controller 112 so that sensor 108 may transmit and/or receive signals. Signals may include electrical, electromagnetic, visual, audio, radio waves, or another undisclosed signal type alone or in combination. In one or more embodiments, controller 112 may retrieve a desired yaw of aircraft 104. For example, and without limitation, controller 112 may retrieve a desired yaw from a database. In another example, and without limitation, a desired yaw may be designated by a user, such as a pilot or an operator. A desired yaw may include a desired movement of an aircraft about a yaw axis, such that a desired yaw will alter the direction the aircraft is pointing, or the heading of the aircraft. For example, and without limitations, a desired yaw may be received from a pilot input, where the pilot input may include a collective, inceptor, foot bake, steering and/or control wheel, control stick, pedals, throttle levers, or the like. In one or more embodiments, controller 112 may be a proportional-integral-derivative (PID) controller. In some embodiments, controller 112 may be a processor or a computing device. In other embodiments, controller 112 may include a processor, which is described further below. In other embodiments, controller 112 may be a flight controller 112, which is described further below.

Still referring to FIG. 1, controller 112 may determine or receive geographical datum 120 from sensor 108. For instance, and without limitation, geographical datum 120 may include a current position of aircraft 104 (also referred to in this disclosure as a "current aircraft position"). A current aircraft position may include a geographical moment of aircraft 104. For example, and without limitations, current position of aircraft 104 may include a geographical location and/or an orientation of aircraft 104. A current aircraft location may include any data describing a geographical moment of aircraft 104 at present time. Current aircraft location may be continually received by controller 112 so that the geographical moment of aircraft 104 is always known by controller 112 or a user, such as a pilot. In one or more embodiments, a current aircraft position may be provided by, for example, a global positioning system (GPS).

With continued reference to FIG. 1, controller 112 may be configured to generate, as a function of sensor datum, at least an aircraft command 140. In one or more embodiments, aircraft command 140 may be an attitude command. Aircraft command may include a command datum that is transmitted to a flight component, such as one or more propellers. An "aircraft command", for the purposes of this disclosure, is an electronic signal representing at least an element of data correlated to pilot and/or controller 112 input representing a desired operation of a flight component of an aircraft. Aircraft command 140 may be a signal to change the heading or trim of electric aircraft 104. Aircraft command 140 may be a signal to change an aircraft's pitch, roll, yaw, or throttle. Aircraft trajectory is manipulated by one or more flight components, such as control surfaces, and propulsors working alone or in tandem consistent with the entirety of this disclosure. "Pitch", for the purposes of this disclosure refers to an aircraft's angle of attack, that is the difference between the aircraft's nose and the horizontal flight trajectory. For example, an aircraft pitches "up" when its nose is angled upward compared to horizontal flight, like in a climb maneuver. In another example, the aircraft pitches "down", when its nose is angled downward compared to horizontal flight, like in a dive maneuver. "Roll" for the purposes of this disclosure, refers to an aircraft's position about its longitudinal axis, that is to say that when an aircraft rotates about its axis from its tail to its nose, and one side rolls upward, like in a banking maneuver. "Yaw", for the purposes of this disclosure, refers to an aircraft's turn angle, when an aircraft rotates about an imaginary vertical axis intersecting the center of the earth and the fuselage of the aircraft. "Throttle", for the purposes of this disclosure, refers to an aircraft outputting an amount of thrust from a propulsor. Aircraft command 140 may include an electrical signal. Aircraft command 140 may include mechanical movement of any throttle consistent with the entirety of this disclosure. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. At least a sensor may include circuitry, computing devices, electronic components or a combination thereof that translates pilot input into at least an aircraft command configured to be transmitted to another electronic component.

Still referring to FIG. 1, controller 112 may include a processor. A processor may include an artificial intelligence configured to process datum from sensor 108. In some embodiments, the processor may include a machine-learning model configured to process datum from sensor 108 or pilot input. A processor may be configured to output an optimal flight trajectory to flight controller 112 of electric aircraft 104. An optimal flight trajectory may include a flight plan and/or maneuver to compensate for experienced. A wind-compensated flight trajectory such as optimal flight trajectory may include a function of aerodynamics and propulsion systems of aircraft 104. For example, a function of thrust coefficients may be included, as discussed further below in this disclosure. In one or more embodiments, a processor may be in communication with controller 112. In some embodiments, a processor may be configured to transmit data to controller 112. In some embodiments, data may include a flight plan, flight commands, flight alerts, and/or environmental data, such as geographical datum 120. In some embodiments, controller 112 may be in communication with sensor 108. Thus, controller 112 may update flight controls, plans, and projected trajectory of electric aircraft 104 based on data from sensor 108. In some embodiments, controller 112 may update flight controls, plans, and projected trajectory of electric aircraft 104 based on an outside input, such as a user input.

In some embodiments, and with continued reference to FIG. 1, controller 112 may be configured to determine one or more sequences in an optimal flight trajectory of electric aircraft 104. For example, and without limitations, controller 112 utilizes a plant model to determine an optimal flight trajectory of aircraft 104, as discussed further below. In some embodiments, an optimal flight trajectory may include a plurality of parameters. The plurality of parameters of the optimal trajectory may include, but is not limited to, current position of aircraft 104 and desired position of aircraft 104, such as desired yaw. In some embodiments, a controller may be positioned in an external computing system. In some embodiments, an external computing system may receive data from sensor 108; thus, controller may send an optimal flight trajectory to electric aircraft 104. For example, and without limitation, controller 112 may send an optimal flight trajectory to electric aircraft 104 wirelessly.

With continued reference to FIG. 1, controller 112 may perform one or more mathematical operations, manipulations, arithmetic, machine-learning, or a combination thereof on one or more elements of data. Controller 112 may be designed to provide a linear approximation of a nonlinear system. Linearization is a linear approximation of a nonlinear system that is valid in a small region around an operating point. Linearization may be employed in higher order systems such that inputs and outputs may be more easily controlled using a control loop. For example, and without limitations, linearization can be used with feedforward control, open loop control, feedback control, among others, alone or in combination.

With continued reference to FIG. 1, system 100 includes plant model 132, which is configured to generate an optimal desired flight trajectory datum 136 for wind compensation and as a function of a desired yaw and geographical datum 120 from sensor 108. Plant model 132 includes a mathematical model, such as a matrix, as discussed further below in this disclosure. A "plant model", for the purposes of this disclosure, is a component of control theory which includes a process and an actuator. A plant is often referred to with a transfer function which indicates the relation between an input signal and the output signal of a system without feedback, commonly determined by physical properties of the system. In a system with feedback, as in illustrative embodiments described in this disclosure, a plant still has the same transfer function, but a control unit and a feedback loop, which possess their own transfer functions, are added to the system. Plant model 132 may include one or more computer models representing rigid body mechanics, rigid body dynamics, or a combination thereof. A "rigid body", for the purposes of this disclosure, is a solid body in which deformation is zero or so small it can be neglected. For example, the distance between any two given points on a rigid body remains constant in time regardless of the external forces or moments exerted on it. Additionally, a rigid body is usually considered as a continuous distribution of mass. The position, kinematic, and kinetic quantities describing the motion of a rigid body include linear and angular components, respectively.

With continued reference to FIG. 1, plant model 132 is configured to generate flight trajectory datum 136. A "flight trajectory datum", for the purposes of this disclosure, is one or more elements of data representing desired moments used for wind compensation by altering an aircraft's heading and/or orientation. Desired moments may include a yaw moment, roll moment, rotation transformation model, and/or a pitch moment. Flight trajectory datum 136 may be generated to provide angle of attack (AoA). An "angle of attack", for the purposes of this disclosure, is the relative angle between a reference line on a body, and the vector representing the relative motion between the body and the fluid through which it is moving. In other words, angle of attack, is the angle between the body's reference line and the oncoming flow. The reference line may include the farthest two points on the rigid body such that the line approximates the length of the rigid body. For example, and without limitation, a reference line may be a longitudinal central axis of aircraft 104, such as central axis 204 of FIG. 2.

Referring now to FIGS. 2A and 2B, exemplary embodiments of a mathematical problem of a plant model 132 is utilized to solve for an optimal flight trajectory datum is shown. Plant model 132 includes a mathematical problem, including matrices, to provide an optimal flight trajectory based on geographical datum 120 from sensor. In a non-limiting example, plant model 132 may predict an optimal trajectory that follows a path through windy weather.

In one or more embodiments, solving a pitch moment model comprises using a linear program to yield a desired pitch moment. In one or more embodiments, pitch moment model, roll moment model, and rotational transformation model may be formulated as a linear objective function, which controller 112 may optimize using a linear program. A "linear program," as used in this disclosure, is a program that optimizes a linear objective function, given at least a constraint. A linear program may be referred to without limitation as a "linear optimization" process and/or algorithm. For instance, in non-limiting illustrative examples, a given constraint might be a pitch moment, and a linear program may use a linear objective function to calculate desired pitch of a current aircraft based on the limit.

System 100 of method of wind compensation may include sequentially solving, by controller 112, a plant model matrix as a function of a desired yaw and a current aircraft position, where sequentially solving includes: solving a pitch moment model, a roll moment model, a rotational transformation model, and a yaw moment model. Plant model 132 includes the mathematical representation:

$$\begin{bmatrix} \dot{\phi} \\ \ddot{\phi} \\ \dot{\Theta} \\ \ddot{\Theta} \\ \ddot{\psi} \\ \dot{x}' \\ \ddot{x}' \\ \dot{y}' \\ \ddot{y}' \end{bmatrix} = \begin{bmatrix} 0 & 1 & 0 & 0 & 0 & 0 & 0 & 0 & 0 \\ -(\omega_{n,\phi})^2 & -2\zeta_\phi\omega_{n,\phi} & 0 & 0 & 0 & 0 & 0 & 0 & 0 \\ 0 & 0 & 0 & 1 & 0 & 0 & 0 & 0 & 0 \\ 0 & 0 & -(\omega_{n,\theta})^2 & -2\zeta_\theta\omega_{n,\theta} & 0 & 0 & 0 & 0 & 0 \\ 0 & 0 & 0 & 0 & -\dfrac{1}{\tau_\psi} & 0 & 0 & 0 & 0 \\ 0 & 0 & 0 & 0 & 0 & 0 & 1 & 0 & 0 \\ -\sin(\psi')\dfrac{T}{m} & 0 & -\cos(\psi')\dfrac{T}{m} & 0 & 0 & -\dfrac{f(\psi')}{m} & 0 & 0 & 0 \\ 0 & 0 & 0 & 0 & 0 & 0 & 0 & 0 & 1 \\ \cos(\psi')\dfrac{T}{m} & 0 & -\sin(\psi')\dfrac{T}{m} & 0 & 0 & 0 & 0 & 0 & -\dfrac{f(\psi')}{m} \end{bmatrix} \begin{bmatrix} \phi \\ \dot{\phi} \\ \Theta \\ \dot{\Theta} \\ \psi \\ x' \\ \dot{x}' \\ y' \\ \dot{y}' \end{bmatrix} + \begin{bmatrix} 0 & 0 & 0 \\ (\omega_{n,\phi})^2 & 0 & 0 \\ 0 & 0 & 0 \\ 0 & (\omega_{n,\theta})^2 & 0 \\ 0 & 0 & \dfrac{1}{\tau_\psi} \\ 0 & 0 & 0 \\ 0 & 0 & 0 \\ 0 & 0 & 0 \\ 0 & 0 & 0 \end{bmatrix} \begin{bmatrix} \phi_{ref} \\ \theta_{ref} \\ \dot{\psi}_{ref} \end{bmatrix} \quad (1)$$

where y=Ix. The terms T/m and −T/m are thrust coefficients (with a time-varying parameter of 9.81 m/s$^2$), where T is thrust and m is a mass of the aircraft. The term f(ψ′) is a function of yaw. The terms −b$_x$/m and −b$_y$/m are damping coefficients, where b is a damping constant (shown in equation (2) below). In one or more embodiments, system identifications $-1/\tau_\psi$, $-2\zeta_\theta\omega_{n,\theta}$, $-2\zeta_\phi\omega_{n,\phi}$, $-(\omega_{n,\phi})^2$, and $-(\omega_{n,\theta})^2$ may be used to solve for remaining coefficients and include model parameters such as $\tau_\psi$ (a time constant), $\omega_n$ (a natural frequency), and ζ (a damping ratio). The variables $\dot{\phi}$ and $\ddot{\phi}$ represent a roll moment, where $\dot{\phi}$ is the roll rate of the aircraft and $\ddot{\phi}$ is the roll acceleration of the aircraft. The variables $\dot{\Theta}$ and $\ddot{\Theta}$ represent a pitch moment, where $\ddot{\Theta}$ is the pitch rate of the aircraft and $\ddot{\Theta}$ is the pitch acceleration of the aircraft. The variable $\ddot{\psi}$ represents a yaw moment, where $\ddot{\psi}$ is a yaw acceleration. Furthermore, $\dot{x}$ is a velocity of the aircraft along the x-axis and $\ddot{x}$ is an acceleration of the aircraft along the x-axis, and $\dot{y}$ is a velocity of the aircraft along the y-axis and $\ddot{y}$ is the acceleration of the aircraft along the y-axis. In one or more embodiments, damping coefficients $-b_x/m$ and $-b_y/m$ may be linearized at low airspeeds.

In one or more embodiments, North may be represented by an x'-axis, East may be represented by a y'-axis, and down (toward the ground) may be represented by a z'-axis. In one or more embodiments, plant model 132 includes mathematical optimization problem (1) that must be solved for coefficients. In one or more embodiments, x and y are endpoint coordinates of a vector. For example, and without limitation, x and y include a local aircraft coordinate system, such as a current aircraft position. Plant model 132 may include local coordinates (x,y). In one or more embodiments, x' and y' include a reference coordinate system, where (x', y') represent a desired position of aircraft 104 to compensate for wind forces experienced for aircraft 104.

In one or more embodiments, North may be represented by the x-axis, East may be represented by the y-axis, and down (toward the ground) may be represented by the z-axis. In one or more embodiments, "yaw angle $\psi$" may be an angle between north and the projection of central axis 204 (shown in FIG. 3) of aircraft 104 onto a horizontal plane; "pitch angle $\theta$" may be an angle between longitudinal axis 304 of aircraft 104 and horizontal plane; and "roll angle $\phi$" may be a rotation about longitudinal axis 204 of aircraft 104. Desired position of aircraft 104 may be represented in terms of coordinates (x',y'), while the plant model 132 is in local coordinates. In one or more embodiments, a local translation x may be coupled to pitch, and a local translation y may be coupled to roll. In one or more embodiments, yaw rotation transformation may apply to pitch-and-roll-induced translation terms.

When using a traditional rotation matrix, the mapping of translation expressed in local aircraft coordinates to a position in reference coordinates results in pitch no longer mapping to translations exclusively along an x' coordinate. Furthermore, GPS data will likely not agree with the model states because the axes are not aligned.

As shown in equation (1), a rotation matrix is included in plant model 132.

In one or more embodiments, the plant model may work effectively when yaw is zero, as shown in equation (2):

pilot input may include a collective, inceptor, foot bake, steering and/or control wheel, control stick, pedals, throttle levers, and the like. The current aircraft location may include any data describing the electric aircraft's geographic moment in that exact moment in time. The current aircraft location may be continually received, such that the geographic location of the electric aircraft is always known. In one or more embodiments, optimization problem of plant model 132 may be solved when yaw rate is set to zero. For example, and without limitations, when $\psi=0$, equation (1) is reduced to the equation shown in equation (2), In one or more embodiments, flight trajectory datum 136 may include a pitch moment, roll moment, yaw moment, and rotational transformation required to execute a flight plan, specific maneuver, flight path, and the like, to compensate for wind forces experienced by aircraft 104.

Plant model 132 may be solved as a function of a desired yaw and a current aircraft position, where the following a sequentially solved: the pitch movement model, the roll moment model, a rotational transformation model, and a yaw moment model.

In one or more embodiments, mathematical problem of plant model 132 may be used to solve for a desired pitch moment. For the purposes of this disclosure, a "desired pitch moment" is an optimal pitch an aircraft must have to maintain a desired trajectory. In one or more embodiments, a pitch moment model may include a linear program. For instance, and without limitation, a linear program may be utilized to yield a desired amount of pitch moment.

In one or more embodiments, mathematical problem of plant model 132 may be used to solve for a desired roll moment. For example, and without limitation, desired roll moment may be a function of a desired pitch moment. In one or more embodiments, a roll moment model may include a linear program. For the purposes of this disclosure, a "desired roll moment" is an optimal roll an aircraft must have to maintain a desired trajectory. For instance, and without limitation, a linear program may be utilized to yield a desired amount of roll moment.

In one or more embodiments, mathematical problem of plant model 132 may be used to solve for a desired rotational transformation. For example, and without limitation, desired rotational transformation may be solved relative to a desired yaw moment. For instance, and without limitation, a linear program may be utilized to yield a desired amount of rotational transformation, such that the rotational transformation is solved relative to yaw rotation. In one or more $$\begin{bmatrix} \dot{\phi} \\ \ddot{\phi} \\ \dot{\Theta} \\ \ddot{\Theta} \\ \ddot{\psi} \\ \dot{x} \\ \ddot{x} \\ \dot{y} \\ \ddot{y} \end{bmatrix} = \begin{bmatrix} 0 & 1 & 0 & 0 & 0 & 0 & 0 & 0 & 0 \\ -(\omega_{n,\phi})^2 & -2\zeta_\phi\omega_{n,\phi} & 0 & 0 & 0 & 0 & 0 & 0 & 0 \\ 0 & 0 & 0 & 1 & 0 & 0 & 0 & 0 & 0 \\ 0 & 0 & -(\omega_{n,\theta})^2 & -2\zeta_\theta\omega_{n,\theta} & 0 & 0 & 0 & 0 & 0 \\ 0 & 0 & 0 & 0 & -\frac{1}{\tau_\psi} & 0 & 0 & 0 & 0 \\ 0 & 0 & 0 & 0 & 0 & 0 & 0 & 0 & 0 \\ 0 & 0 & -\frac{T}{m} & 0 & 0 & 0 & -\frac{b_x}{m} & 0 & 0 \\ 0 & 0 & 0 & 0 & 0 & 0 & 0 & 0 & 1 \\ \frac{T}{m} & 0 & 0 & 0 & 0 & 0 & 0 & 0 & -\frac{b_y}{m} \end{bmatrix} \begin{bmatrix} \phi \\ \dot{\phi} \\ \Theta \\ \dot{\Theta} \\ \dot{\psi} \\ x \\ \dot{x} \\ y \\ \dot{y} \end{bmatrix} + \begin{bmatrix} 0 & 0 & 0 \\ (\omega_{n,\phi})^2 & 0 & 0 \\ 0 & 0 & 0 \\ 0 & (\omega_{n,\theta})^2 & 0 \\ 0 & 0 & \frac{1}{\tau_\psi} \\ 0 & 0 & 0 \\ 0 & 0 & 0 \\ 0 & 0 & 0 \\ 0 & 0 & 0 \end{bmatrix} \begin{bmatrix} \phi_{ref} \\ \theta_{ref} \\ \psi_{ref} \end{bmatrix} \quad (2)$$

A desired yaw may include the desired movement of the electric aircraft around the yaw axis, such that desired yaw will alter the direction the electric aircraft is pointing. A desired yaw may be received from a pilot input, wherein the embodiments, desired rotational transformation may be solved relative to a desired yaw moment. In one or more embodiments, rotational transformation model may be a linear program. For instance, and without limitation, a linear program may be utilized to yield a desired amount of rotational transformation, such that the rotational transformation is solved relative to yaw rotation.

In one or more embodiments, mathematical problem of plant model 132 may be used to solve for a desired yaw moment model. For the purposes of this disclosure, a "desired yaw moment" is an optimal yaw an aircraft must have to maintain a desired trajectory. Solving a yaw moment model may include utilizing a linear program, to yield a desired amount of yaw moment as a function of the desired amount of pitch moment, the desired amount of roll moment, and the desired amount of rotational transformation previously solved for, as described above.

After sequentially solving each moment, controller 112 may generate an optimal flight trajectory to compensate for wind. For instance, and without limitations, optimal flight trajectory datum may include a required pitch moment, a roll moment, a yaw moment, and a rotational transformation required to execute a flight plan, specific maneuver, flight path, and the like.

Figure 2:
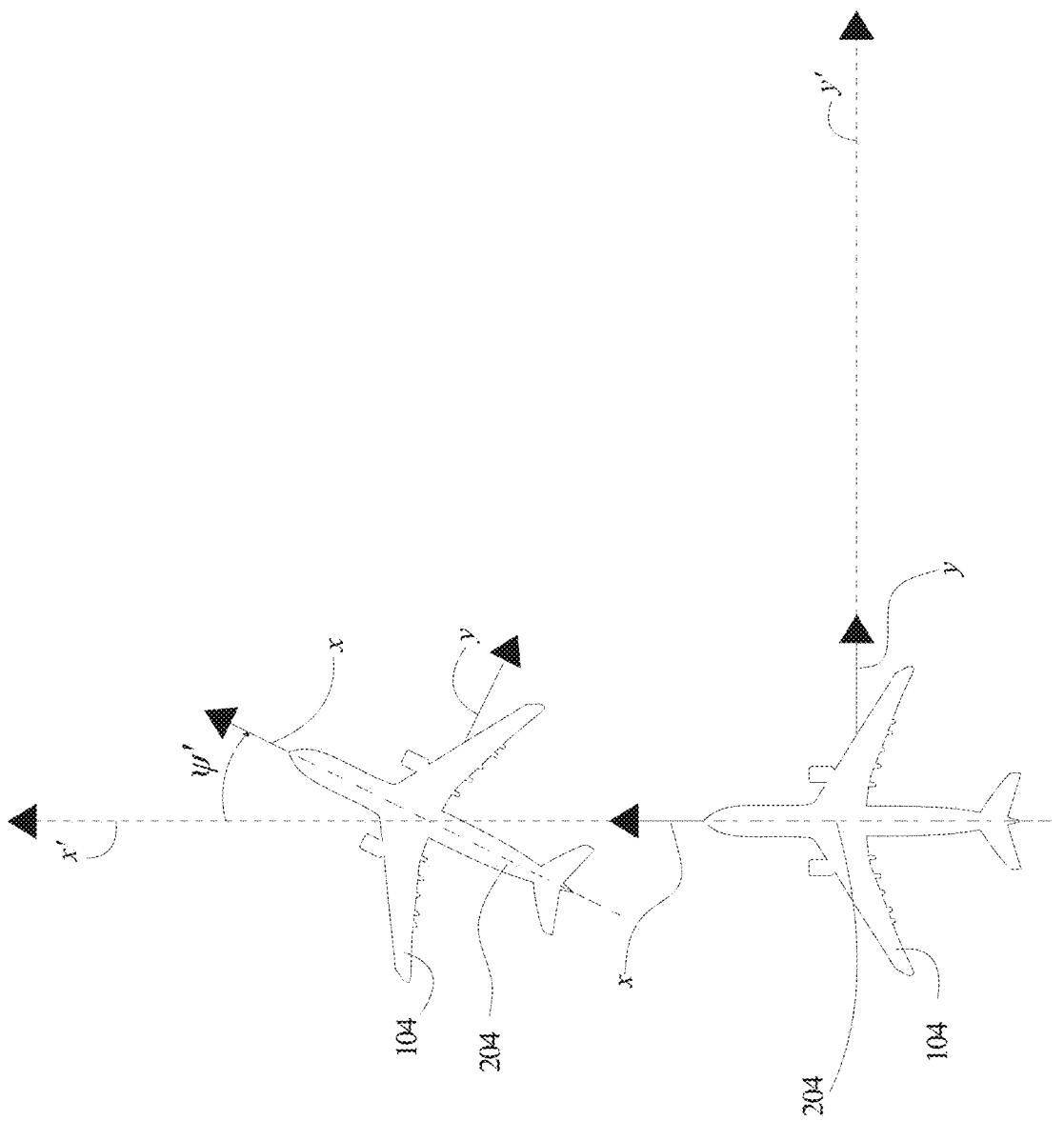
FIG. 2 is another illustrative embodiment of a system for an aircraft motion observer configured for use in electric aircraft in block diagram form in accordance with one or more aspects of the present disclosure.

Now referring to FIG. 2, a diagrammatic representation of an exemplary aircraft 104 and a corresponding trajectory are shown. In one or more embodiments, x and y include a current aircraft coordinate system, such as a current aircraft position. Plant model 132 may include local coordinates (x,y), to solve for a desired pitch moment, roll moment, rotational transformation, and yaw moment. In one or more embodiments, x' and y' include a reference coordinate system, where (x', y') represent a desired position of aircraft 104 to compensate for experience wind forces.

Figure 3:
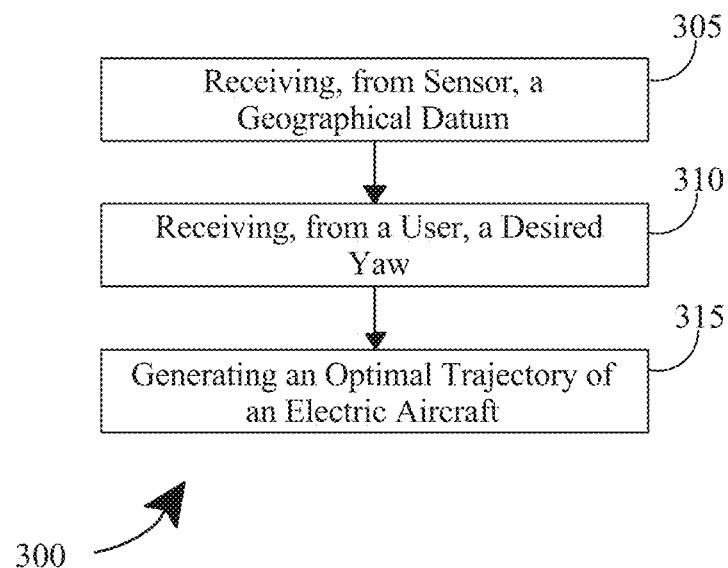
FIG. 3 is an exemplary method of an aircraft motion observer configured for use in electric aircraft in block diagram form in accordance with one or more aspects of the present disclosure.

FIG. 3 shows a flow chart illustrating a method 300 for wind compensation of an aircraft executed by controller 112 of system 100. As shown in block 305, method 300 includes receiving, from sensor 108, geographical datum 120. As previously mentioned in this disclosure, geographical datum may include a location, position, orientation, or the like of an aircraft. Sensor 108 may then transmit detected geographical datum 120 to controller 112. Sensor 108 may include, for example, an altimeter that may include a sonic, radar, and/or Global Positioning System (GPS) altimeter, which may provide geographical datum 120, such as location and/or orientation datum, of aircraft 104 to controller 112. Additionally, other sensors of sensor 108 may be used to provide similar or the same datum. For example, a gyroscope or accelerometer may provide datum regarding current aircraft position to controller 112, as discussed in this disclosure.

As shown in block 310, method 300 includes receiving from a user a desired yaw. For example, and without limitations, controller 112 may receive a desired yaw from a user. A desired yaw may include a desired movement of an aircraft about a yaw axis, such that a desired yaw will alter the direction the aircraft is pointing, or the heading of the aircraft. For example, and without limitations, a desired yaw may be received from a pilot input, where the pilot input may include a collective, inceptor, foot bake, steering and/or control wheel, control stick, pedals, throttle levers, or the like.

As shown in block 320, method 300 includes generating an optimal flight trajectory of electric aircraft 104. The method of generating an optimal flight trajectory includes sequentially solving, by controller 112, plant model matrix 132 as a function of a desired yaw and a current aircraft position, as discussed previously in this disclosure. In one or more embodiments, sequentially solving includes: solving a pitch moment model, a roll moment model, a rotational transformation model, and a yaw moment model. In one or more embodiments, solving a pitch moment model includes using a linear program to yield a desired amount of pitch. Then, solving a roll moment model may include using a linear program to yield a desired amount of roll moment as a function of the desired amount of pitch moment previously solved for. Next, solving a rotational transformation model may include using linear program to yield a desired amount of rotational transformation, where the rotational transformation is solved relative to a yaw rotation, which may be a linear program. This may include utilizing a linear program to yield the desired amount of rotational transformation, such that the rotational transformation is solved relative to yaw rotation. Lastly, solving a yaw moment model may include utilizing a linear program, to yield a desired amount of yaw moment as a function of the desired amount of pitch moment, the desired amount of roll moment, and the desired amount of rotational transformation. In one or more embodiments, an aircraft command may then be generated by controller 112 and transmitted to a flight component of aircraft 104 so that aircraft 104 may obtain and/or maintain an optimal flight trajectory despite wind forces experienced by aircraft 104.

Figure 4:
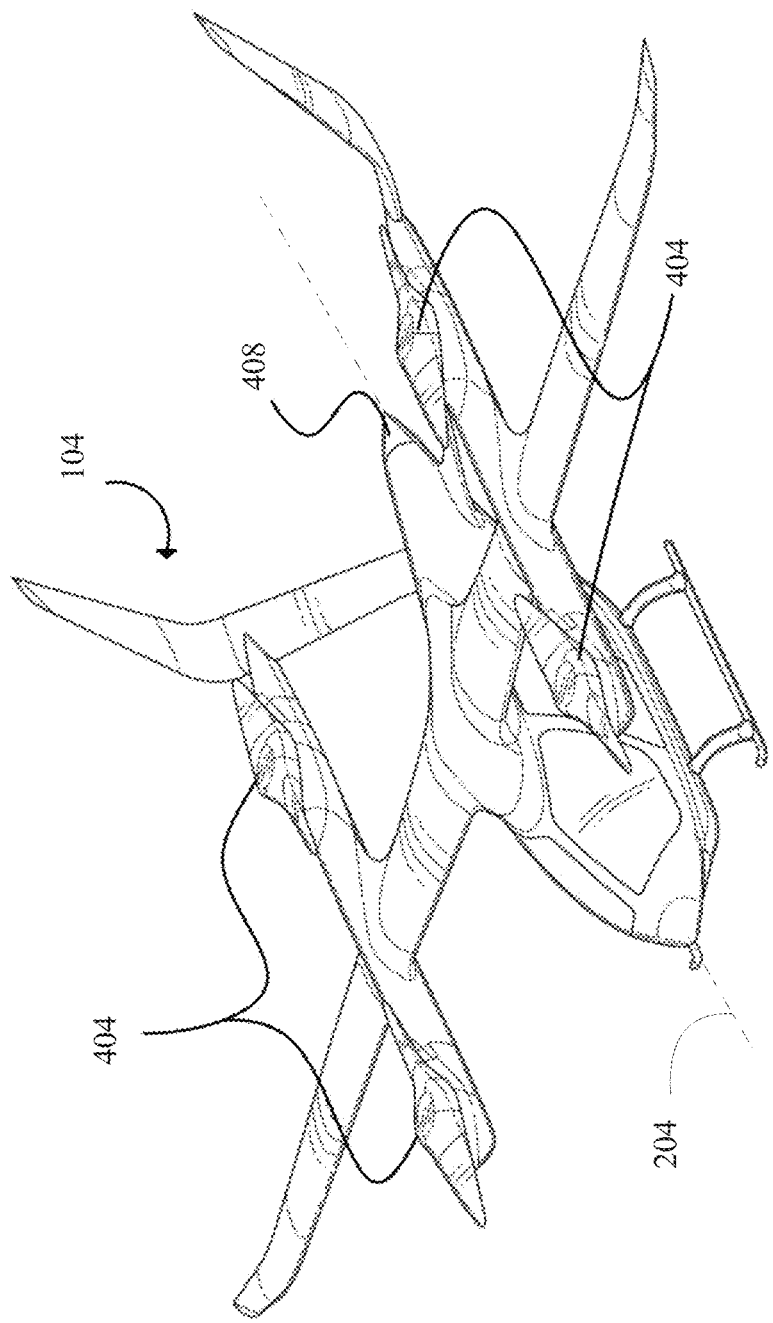
FIG. 4 is an illustration of an embodiment of an electric aircraft in accordance with one or more aspects of the present disclosure.

Referring now to FIG. 4, in one or more embodiments, aircraft 104 may include a vertical takeoff and landing aircraft (eVTOL). As used herein, a vertical take-off and landing (eVTOL) aircraft is an electrically powered aircraft that can take off and land vertically. An eVTOL aircraft may be capable of hovering. In order, without limitation, to optimize power and energy necessary to propel an eVTOL or to increase maneuverability, the eVTOL may be capable of rotor-based cruising flight, rotor-based takeoff, rotor-based landing, fixed-wing cruising flight, airplane-style takeoff, airplane-style landing, and/or any combination thereof. Rotor-based flight is where the aircraft generates lift and propulsion by way of one or more powered rotors coupled with an engine, such as a "quad copter," helicopter, or other vehicle that maintains its lift primarily using downward thrusting propulsors. Fixed-wing flight, as described herein, flight using wings and/or foils that generate life caused by an aircraft's forward airspeed and the shape of the wings and/or foils, such as in airplane-style flight.

With continued reference to FIG. 4, a number of aerodynamic forces may act upon aircraft 104 during flight. Forces acting on aircraft 104 during flight may include, without limitation, thrust, a forward force produced by a propulsor of aircraft 104, which may act parallel to a longitudinal axis 204 of aircraft 104 (shown in FIG. 3). Another force acting upon aircraft 104 may include, without limitation, drag, defined as a rearward retarding force which is caused by disruption of airflow by any protruding surface of aircraft 104 such as, without limitation, a wing, rotor, and/or fuselage. Drag may oppose thrust and act rearward parallel to relative wind. A further force acting upon aircraft 104 may include, without limitation, weight, which may include a combined load of aircraft 104 itself, crew, baggage, and/or fuel. Weight may pull aircraft 104 downward due to the force of gravity. An additional force acting on aircraft 104 may include, without limitation, lift, which may act to oppose the downward force of weight and may be produced by a dynamic effect of air acting on an airfoil and/or downward thrust from a propulsor of aircraft 104. Lift generated by an airfoil may depend on speed of airflow, density of air, total area of the airfoil and/or a segment thereof, and/or an angle of attack between air and the airfoil. In a non-limiting example, aircraft 104 may be designed to be as lightweight as possible.

Referring still to FIG. 4, aircraft 104 may include at least a vertical propulsor 404 and at least a forward propulsor 408. At least a forward propulsor 408 as used in this disclosure is a propulsor positioned for propelling an aircraft in a "forward" direction; at least a forward propulsor may include one or more propulsors mounted on the front, on the wings, at the rear, or a combination of any such positions. At least a forward propulsor may propel an aircraft forward for fixed-wing and/or "airplane"-style flight, takeoff, and/or landing, and/or may propel aircraft 104 forward or backward on the ground. At least a vertical propulsor 404 and at least a forward propulsor 408 includes a thrust element. At least a thrust element may include any device or component that converts the mechanical energy of a motor, for instance in the form of rotational motion of a shaft, into thrust in a fluid medium. At least a thrust element may include, without limitation, a device using moving or rotating foils, including without limitation one or more rotors, an airscrew or propeller, a set of airscrews or propellers such as contrarotating propellers, a moving or flapping wing, or the like. At least a thrust element may include without limitation a marine propeller or screw, an impeller, a turbine, a pump-jet, a paddle or paddle-based device, or the like. As another non-limiting example, at least a thrust element may include an eight-bladed pusher propeller, such as an eight-bladed propeller mounted behind the engine to ensure the drive shaft is in compression. Propulsors may include at least a motor mechanically connected to the at least a first propulsor as a source of thrust.

With continued reference to FIG. 4, the generated optimal flight trajectory may result in aircraft command 140 being transmitted from controller 112 to flight components of aircraft 104. Aircraft command 140 may include a desired function of flight components to maintain trajectory of an aircraft despite wind forces acting on the aircraft. As previously mentioned, "flight components", for the purposes of this disclosure, include components related to and mechanically connected to an aircraft that manipulates a fluid medium in order to propel and maneuver the aircraft through the fluid medium. An aircraft's "trajectory", for the purposes of this disclosure, is the flight path that an object with mass in motion follows through space as a function of time.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments describe herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
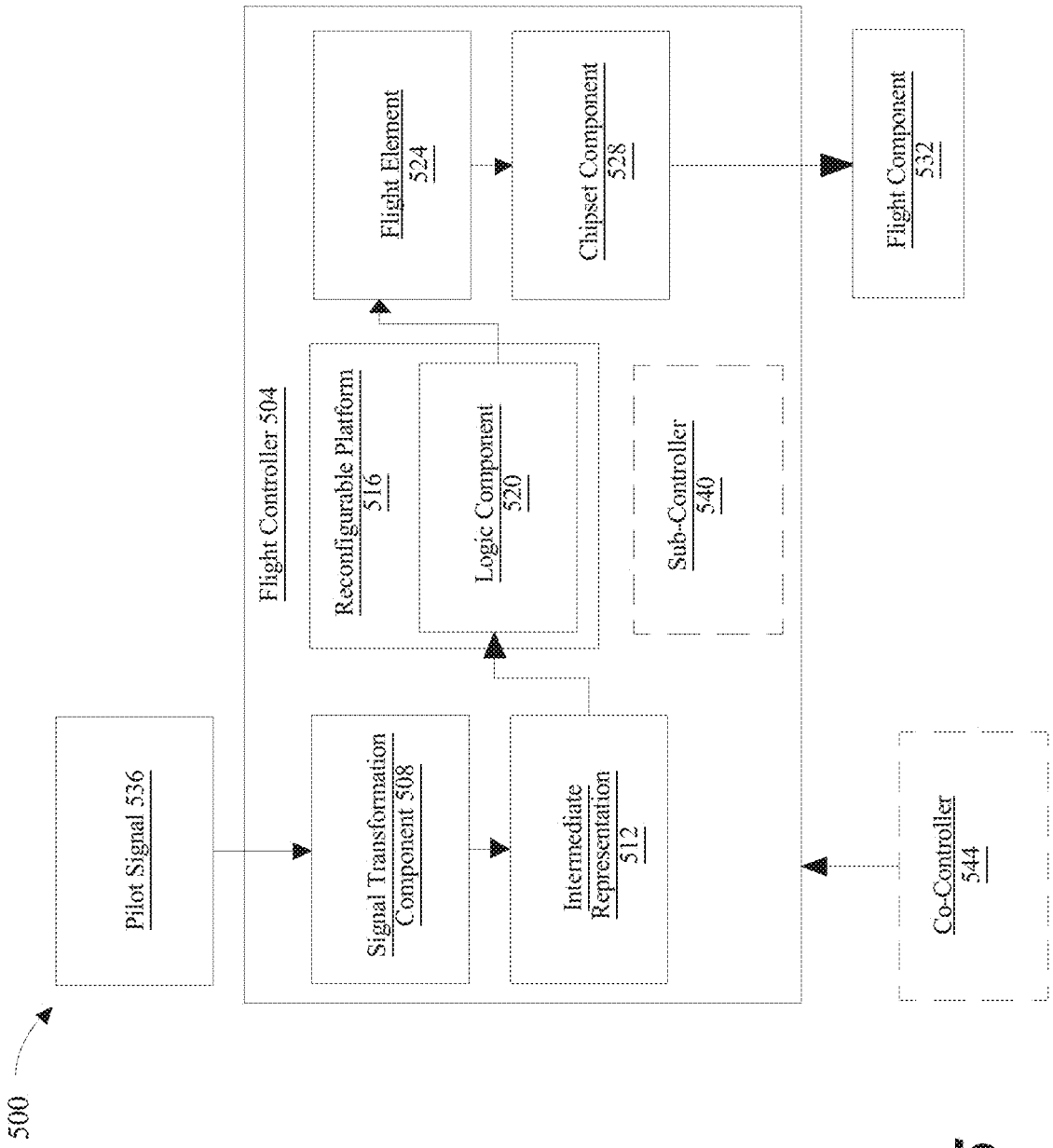
FIG. 5 is a block diagram of a flight controller in accordance with one or more aspects of the present disclosure.

Now referring to FIG. 5, an exemplary embodiment 500 of a flight controller 504 is illustrated. As used in this disclosure a "flight controller" is a computing device of a plurality of computing devices dedicated to data storage, security, distribution of traffic for load balancing, and flight instruction. Flight controller 504 may include and/or communicate with any computing device as described in this disclosure, including without limitation a microcontroller, microprocessor, digital signal processor (DSP) and/or system on a chip (SoC) as described in this disclosure. Further, flight controller 504 may include a single computing device operating independently, or may include two or more computing device operating in concert, in parallel, sequentially or the like; two or more computing devices may be included together in a single computing device or in two or more computing devices. In embodiments, flight controller 504 may be installed in an aircraft, may control the aircraft remotely, and/or may include an element installed in the aircraft and a remote element in communication therewith.

In an embodiment, and still referring to FIG. 5, flight controller 504 may include a signal transformation component 508. As used in this disclosure a "signal transformation component" is a component that transforms and/or converts a first signal to a second signal, wherein a signal may include one or more digital and/or analog signals. For example, and without limitation, signal transformation component 508 may be configured to perform one or more operations such as preprocessing, lexical analysis, parsing, semantic analysis, and the like thereof. In an embodiment, and without limitation, signal transformation component 508 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 508 may include transforming one or more low-level languages such as, but not limited to, machine languages and/or assembly languages. For example, and without limitation, signal transformation component 508 may include transforming a binary language signal to an assembly language signal. In an embodiment, and without limitation, signal transformation component 508 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 5, signal transformation component 508 may be configured to optimize an intermediate representation 512. As used in this disclosure an "intermediate representation" is a data structure and/or code that represents the input signal. Signal transformation component 508 may optimize intermediate representation as a function of a data-flow analysis, dependence analysis, alias analysis, pointer analysis, escape analysis, and the like thereof. In an embodiment, and without limitation, signal transformation component 508 may optimize intermediate representation 512 as a function of one or more inline expansions, dead code eliminations, constant propagation, loop transformations, and/or automatic parallelization functions. In another embodiment, signal transformation component 508 may optimize intermediate representation as a function of a machine dependent optimization such as a peephole optimization, wherein a peephole optimization may rewrite short sequences of code into more efficient sequences of code. Signal transformation component 508 may optimize intermediate representation to generate an output language, wherein an "output language," as used herein, is the native machine language of flight controller 504. For example, and without limitation, native machine language may include one or more binary and/or numerical languages.

In an embodiment, and without limitation, signal transformation component 508 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 5, flight controller 504 may include a reconfigurable hardware platform 516. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 516 may be reconfigured to enact any algorithm and/or algorithm selection process received from another computing device and/or created using machine-learning processes.

Still referring to FIG. 5, reconfigurable hardware platform 516 may include a logic component 520. As used in this disclosure a "logic component" is a component that executes instructions on output language. For example, and without limitation, logic component may perform basic arithmetic, logic, controlling, input/output operations, and the like thereof. Logic component 520 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 520 may be organized according to Von Neumann and/or Harvard architecture as a non-limiting example. Logic component 520 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 520 may include one or more integrated circuit microprocessors, which may contain one or more central processing units, central processors, and/or main processors, on a single metal-oxide-semiconductor chip. Logic component 520 may be configured to execute a sequence of stored instructions to be performed on the output language and/or intermediate representation 512. Logic component 520 may be configured to fetch and/or retrieve the instruction from a memory cache, wherein a "memory cache," as used in this disclosure, is a stored instruction set on flight controller 504. Logic component 520 may be configured to decode the instruction retrieved from the memory cache to opcodes and/or operands. Logic component 520 may be configured to execute the instruction on intermediate representation 512 and/or output language. For example, and without limitation, logic component 520 may be configured to execute an addition operation on intermediate representation 512 and/or output language.

In an embodiment, and without limitation, logic component 520 may be configured to calculate a flight element 524. As used in this disclosure a "flight element" is an element of datum denoting a relative status of aircraft. For example, and without limitation, flight element 524 may denote one or more torques, thrusts, airspeed velocities, forces, altitudes, groundspeed velocities, directions during flight, directions facing, forces, orientations, and the like thereof. For example, and without limitation, flight element 524 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 524 may denote that aircraft is following a flight path accurately and/or sufficiently.

Still referring to FIG. 5, flight controller 504 may include a chipset component 528. As used in this disclosure a "chipset component" is a component that manages data flow. In an embodiment, and without limitation, chipset component 528 may include a northbridge data flow path, wherein the northbridge dataflow path may manage data flow from logic component 520 to a high-speed device and/or component, such as a RAM, graphics controller, and the like thereof. In another embodiment, and without limitation, chipset component 528 may include a southbridge data flow path, wherein the southbridge dataflow path may manage data flow from logic component 520 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 528 may manage data flow between logic component 520, memory cache, and a flight component 532. As used in this disclosure a "flight component" is a portion of an aircraft that can be moved or adjusted to affect one or more flight elements. For example, flight component 632 may include a component used to affect the aircraft's roll and pitch which may comprise one or more ailerons. As a further example, flight component 532 may include a rudder to control yaw of an aircraft. In an embodiment, chipset component 528 may be configured to communicate with a plurality of flight components as a function of flight element 524. For example, and without limitation, chipset component 528 may transmit to an aircraft rotor to reduce torque of a first lift propulsor and increase the forward thrust produced by a pusher component to perform a flight maneuver.

In an embodiment, and still referring to FIG. 5, flight controller 504 may be configured generate an autonomous function. As used in this disclosure an "autonomous function" is a mode and/or function of flight controller 504 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 524. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 504 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 504 will control the ailerons and/or rudders. As used in this disclosure "non-autonomous mode" is a mode that denotes a pilot will control aircraft and/or maneuvers of aircraft in its entirety.

In an embodiment, and still referring to FIG. 5, flight controller 504 may generate autonomous function as a function of an autonomous machine-learning model. As used in this disclosure an "autonomous machine-learning model" is a machine-learning model to produce an autonomous function output given flight element 524 and a pilot signal 536 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 536 may denote that a pilot is controlling and/or maneuvering ailerons, wherein the pilot is not in control of the rudders and/or propulsors. In an embodiment, pilot signal 536 may include an implicit signal and/or an explicit signal. For example, and without limitation, pilot signal 536 may include an explicit signal, wherein the pilot explicitly states there is a lack of control and/or desire for autonomous function. As a further non-limiting example, pilot signal 536 may include an explicit signal directing flight controller 504 to control and/or maintain a portion of aircraft, a portion of the flight plan, the entire aircraft, and/or the entire flight plan. As a further non-limiting example, pilot signal 536 may include an implicit signal, wherein flight controller 504 detects a lack of control such as by a malfunction, torque alteration, flight path deviation, and the like thereof. In an embodiment, and without limitation, pilot signal 536 may include one or more explicit signals to reduce torque, and/or one or more implicit signals that torque may be reduced due to reduction of airspeed velocity. In an embodiment, and without limitation, pilot signal 536 may include one or more local and/or global signals. For example, and without limitation, pilot signal 536 may include a local signal that is transmitted by a pilot and/or crew member. As a further non-limiting example, pilot signal 536 may include a global signal that is transmitted by air traffic control and/or one or more remote users that are in communication with the pilot of aircraft. In an embodiment, pilot signal 536 may be received as a function of a tri-state bus and/or multiplexor that denotes an explicit pilot signal should be transmitted prior to any implicit or global pilot signal.

Still referring to FIG. 5, autonomous machine-learning model may include one or more autonomous machine-learning processes such as supervised, unsupervised, or reinforcement machine-learning processes that flight controller 504 and/or a remote device may or may not use in the generation of autonomous function. As used in this disclosure "remote device" is an external device to flight controller 504. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 5, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 504 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 5, flight controller 504 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 504. Remote device and/or FPGA may transmit a signal, bit, datum, or parameter to flight controller 504 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 504 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 5, flight controller 504 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 5, flight controller 504 may include, but is not limited to, for example, a cluster of flight controllers in a first location and a second flight controller or cluster of flight controllers in a second location. Flight controller 504 may include one or more flight controllers dedicated to data storage, security, distribution of traffic for load balancing, and the like. Flight controller 504 may be configured to distribute one or more computing tasks as described below across a plurality of flight controllers, which may operate in parallel, in series, redundantly, or in any other manner used for distribution of tasks or memory between computing devices. For example, and without limitation, flight controller 504 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 5, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 532. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 5, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 504. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 512 and/or output language from logic component 520, wherein output language may include one or more analog-to-digital conversions, low bit rate transmissions, message encryptions, digital signals, binary signals, logic signals, analog signals, and the like thereof described above in detail.

Still referring to FIG. 5, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 5, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 5, flight controller 504 may also be implemented using a "shared nothing" architecture in which data is cached at the worker, in an embodiment, this may enable scalability of aircraft and/or computing device. Flight controller 504 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 5, flight controller may include a sub-controller 540. As used in this disclosure a "sub-controller" is a controller and/or component that is part of a distributed controller as described above; for instance, flight controller 504 may be and/or include a distributed flight controller made up of one or more sub-controllers. For example, and without limitation, sub-controller 540 may include any controllers and/or components thereof that are similar to distributed flight controller and/or flight controller as described above. Sub-controller 540 may include any component of any flight controller as described above. Sub-controller 540 may be implemented in any manner suitable for implementation of a flight controller as described above. As a further non-limiting example, sub-controller 540 may include one or more processors, logic components and/or computing devices capable of receiving, processing, and/or transmitting data across the distributed flight controller as described above. As a further non-limiting example, sub-controller 540 may include a controller that receives a signal from a first flight controller and/or first distributed flight controller component and transmits the signal to a plurality of additional sub-controllers and/or flight components.

Still referring to FIG. 5, flight controller may include a co-controller 544. As used in this disclosure a "co-controller" is a controller and/or component that joins flight controller 504 as components and/or nodes of a distributer flight controller as described above. For example, and without limitation, co-controller 544 may include one or more controllers and/or components that are similar to flight controller 504. As a further non-limiting example, co-controller 544 may include any controller and/or component that joins flight controller 504 to distributer flight controller. As a further non-limiting example, co-controller 544 may include one or more processors, logic components and/or computing devices capable of receiving, processing, and/or transmitting data to and/or from flight controller 504 to distributed flight control system. Co-controller 544 may include any component of any flight controller as described above. Co-controller 544 may be implemented in any manner suitable for implementation of a flight controller as described above.

In an embodiment, and with continued reference to FIG. 5, flight controller 504 may be designed and/or configured to perform any method, method step, or sequence of method steps in any embodiment described in this disclosure, in any order and with any degree of repetition. For instance, flight controller 504 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 6:
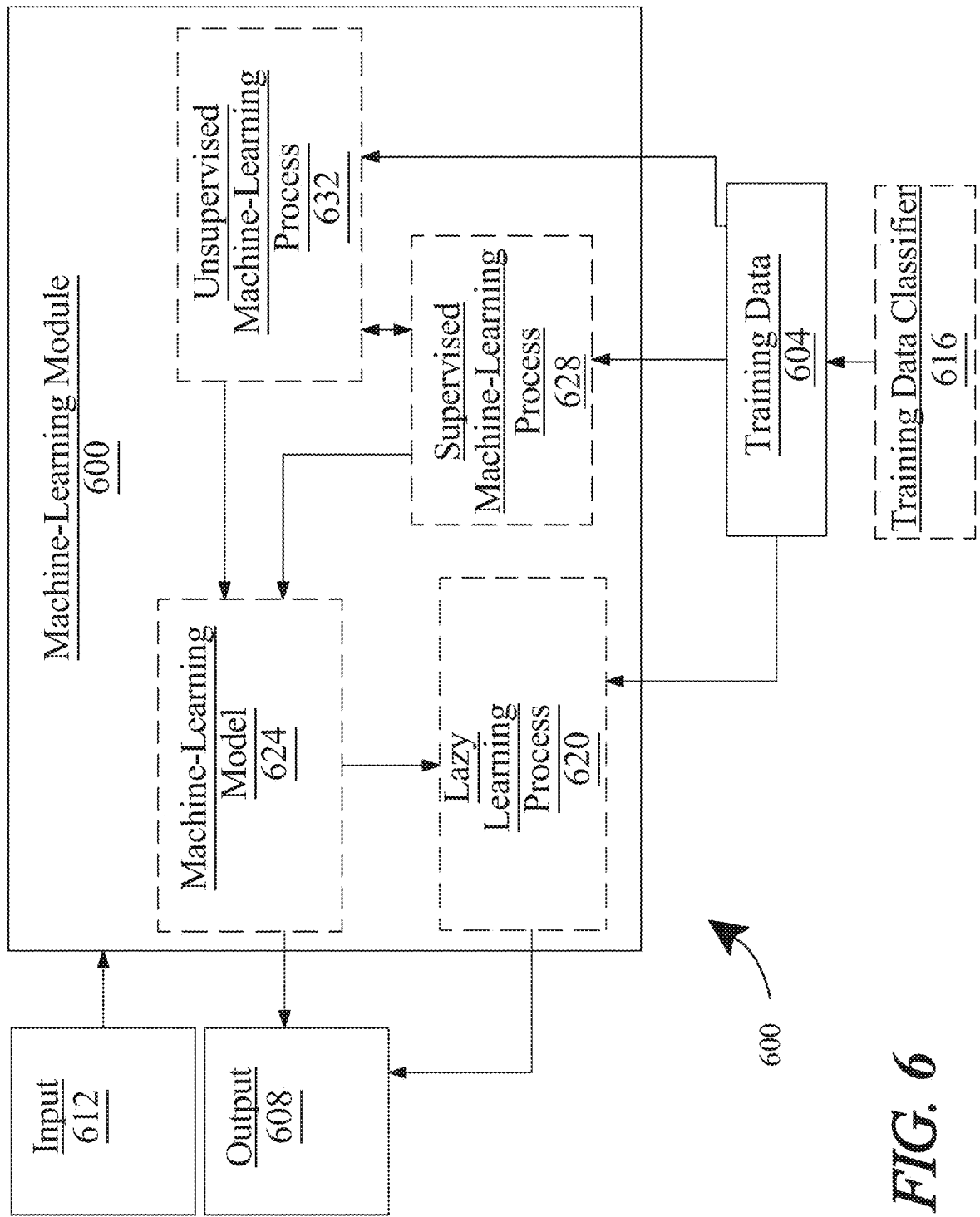
FIG. 6 is a block diagram of an exemplary embodiment of a machine-learning module in accordance with one or more aspects of the present disclosure.

Referring now to FIG. 6, an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 604 to generate an algorithm that will be performed by a computing device/module to produce outputs 608 given data provided as inputs 612; this is in contrast to a non-machine learning software program where the commands to be executed are determined in advance by a user and written in a programming language.

Still referring to FIG. 6, "training data," as used herein, is data containing correlations that a machine-learning process may use to model relationships between two or more categories of data elements. For instance, and without limitation, training data 604 may include a plurality of data entries, each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure. As a non-limiting illustrative example flight elements and/or pilot signals may be inputs, wherein an output may be an autonomous function.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 600 may generate a classifier using a classification algorithm, defined as a processes whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

Further referring to FIG. 6, machine learning processes may include at least an unsupervised machine-learning processes 632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
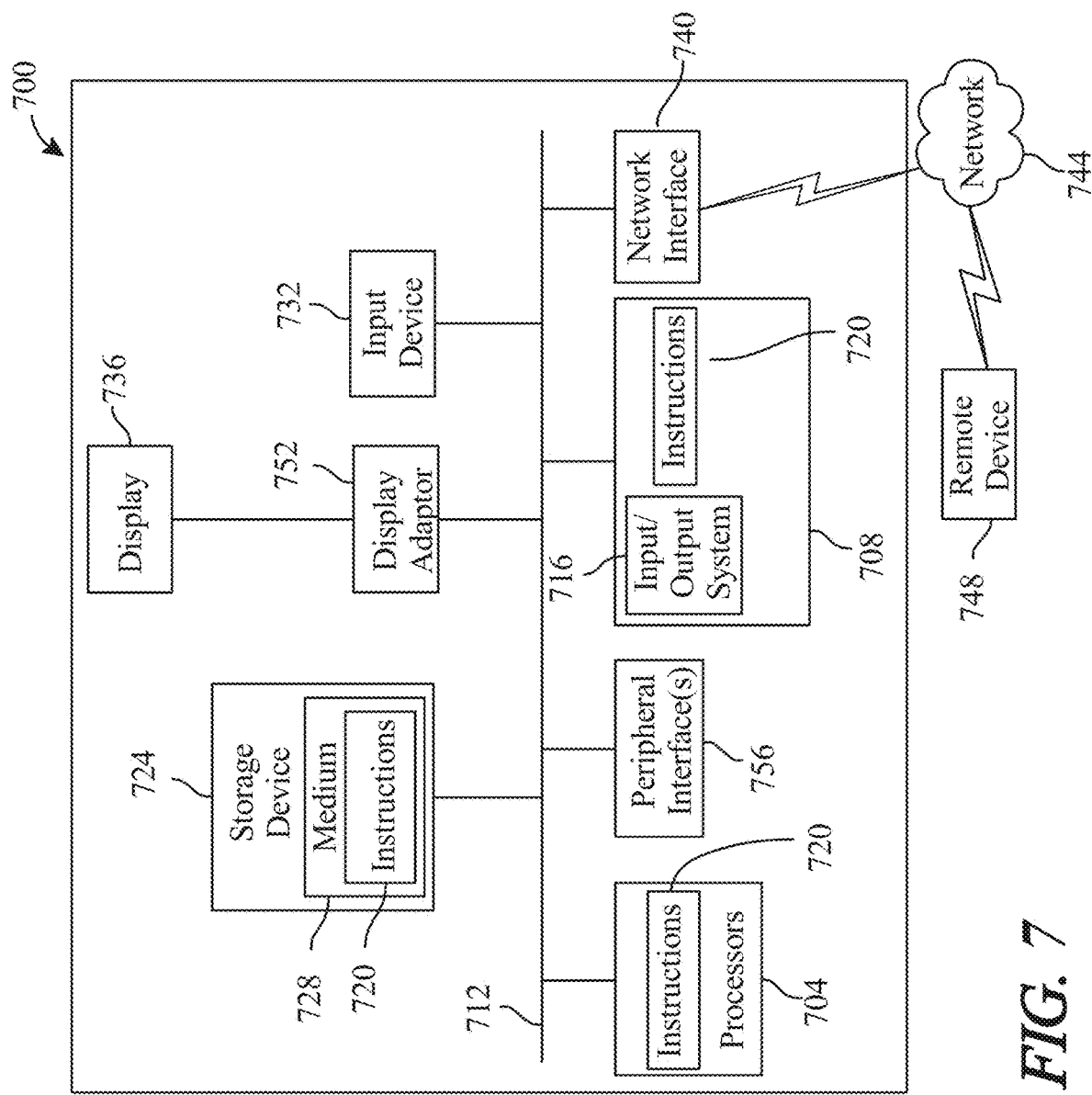
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Still referring to FIG. 7, processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

With continued reference to FIG. 7, memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Still referring to FIG. 7, computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Referring to FIG. 7, computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

Still referring to FIG. 7, a user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

With continued reference to FIG. 7, computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for an aircraft, the system comprising:
   a sensor attached to the aircraft, wherein the sensor is configured to detect a geographical datum; and
   a processor communicatively connected to the sensor, wherein the processor is configured to:
      receive sensor data comprising the geographical datum from the sensor;
      generate an optimal flight trajectory of the aircraft based on the geographical datum, wherein generating the optimal flight trajectory comprises:
         generating, based on a geographical datum and by solving a plant model iteratively, the optimal flight trajectory;
      generate, based on the optimal flight trajectory, an aircraft command, wherein the aircraft command is associated with a first change in at least one of a heading, a trim, a pitch, a roll, a yaw, or a thrust of the aircraft; and
      control the aircraft based on the aircraft command, wherein controlling the aircraft based on the aircraft command causes one or more mechanical movements of the aircraft, the one or more mechanical movements being configured to cause the first change.

2. The system of claim 1, wherein the geographical datum comprises coordinates of the aircraft.

3. The system of claim 2, wherein the coordinates of the aircraft comprise local coordinates.

4. The system of claim 1, wherein the plant model is associated with one or more objective functions and the one or more objective functions comprises a pitch moment model.

5. The system of claim 1, wherein the plant model is associated with one or more objective functions and the one or more objective functions comprises a roll moment model.

6. The system of claim 1, wherein the plant model is associated with one or more objective functions and the one or more objective functions comprises a rotational transformation model.

7. The system of claim 1, wherein solving plant model comprises:
   optimizing one or more objective functions associated with the plant model; and
   solving the one or more objective functions.

8. The system of claim 1, wherein the plant model comprises a plurality of time-varying thrust coefficients.

9. The system of claim 1, wherein the plant model comprises a mass coefficient.

10. The system of claim 1, wherein solving the plant model comprises solving the plant model using a linear program.

11. A method for controlling an electric aircraftaircraft, the method comprising:
    receiving sensor data comprising a geographical datum from a sensor communicatively connected to a processor;
    generating, by the processor, an optimal flight trajectory of the electric aircraftaircraft based on the geographical datum, wherein generating the optimal flight trajectory comprises:
       generating, based on the geographical datum and by solving a plant model iteratively, the optimal flight trajectory;
    generating, based on the optimal flight trajectory, an aircraft command, wherein the aircraft command is associated with a first change in at least one of a heading, a trim, a pitch, a roll, a yaw, or a thrust of the aircraft; and
    controlling the aircraft based on the aircraft command, wherein controlling the aircraft based on the aircraft command causes one or more mechanical movements of the aircraft, the one or more mechanical movements being configured to cause the first change.

12. The method of claim 11, wherein receiving the geographical datum further comprises receiving coordinates of the aircraft.

13. The method of claim 12, wherein receiving the coordinates of the aircraft comprises receiving local coordinates.

14. The method of claim 11, wherein the plant model is associated with a pitch moment model.

15. The method of claim 11, wherein the plant model is associated with a roll moment model.

16. The method of claim 11, wherein the plant model is associated with a rotational transformation model.

17. The method of claim 11, wherein solving the plant model comprises:
    optimizing one or more objective functions associated with the plant model; and
    solving the one or more objective functions.

18. The method of claim 11, wherein the plant model comprises a plurality of time-varying coefficients.

19. The method of claim 11, wherein the plant model comprises one or more mass coefficients.

20. The method of claim 11, wherein solving the plant model comprises solving the plant model using a linear program.

* * * * *